United States Patent
Grandjean et al.

(10) Patent No.: US 10,006,103 B2
(45) Date of Patent: Jun. 26, 2018

(54) USE OF AN ORGANIC-INORGANIC HYBRID MATERIAL FOR EXTRACTING URANIUM(VI) FROM A SULFURIC ACID AQUEOUS SOLUTION, ISSUED NOTABLY FROM THE SULFURIC LEACHING OF A URANIUM-BEARING ORE

(71) Applicant: COMMISSARIAT A L'ENERGIE ATOMIQUE ET AUX ENERGIES ALTERNATIVES, Paris (FR)

(72) Inventors: Agnes Grandjean, Saint Marcel de Careiret (FR); Frederic Cuer, Cornillon (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 58 days.

(21) Appl. No.: 15/034,779

(22) PCT Filed: Nov. 6, 2014

(86) PCT No.: PCT/EP2014/073913
§ 371 (c)(1),
(2) Date: May 5, 2016

(87) PCT Pub. No.: WO2015/067689
PCT Pub. Date: May 14, 2015

(65) Prior Publication Data
US 2016/0289796 A1    Oct. 6, 2016

(30) Foreign Application Priority Data
Nov. 8, 2013    (FR) ..................................... 13 60974

(51) Int. Cl.
*C22B 60/00*    (2006.01)
*C22B 60/02*    (2006.01)
(Continued)

(52) U.S. Cl.
CPC ........... *C22B 60/0234* (2013.01); *B01J 20/22* (2013.01); *B01J 20/28083* (2013.01);
(Continued)

(58) Field of Classification Search
CPC ... C22B 60/0234; C22B 60/0252; C22B 3/24; B01J 20/22; B01J 20/28083; B01J 20/28085
(Continued)

(56) References Cited

U.S. PATENT DOCUMENTS 4,622,366 A    11/1986  Sugo et al.
5,891,574 A    4/1999   Guilard et al.
(Continued)

FOREIGN PATENT DOCUMENTS

WO    2013/167516    * 11/2013
WO    2014/127860    *  8/2014
WO    2014/139869    *  9/2014

OTHER PUBLICATIONS

Turgis et al, "Uranium extraction from phosphoric acid using bifunctional amido-phosphonic acid ligands", Solvent Extraction and Ion Exchange, 32: pp. 478-491, Mar. 2014.*
(Continued)

*Primary Examiner* — Steven J Bos
(74) *Attorney, Agent, or Firm* — Oblon, McClelland, Maier & Neustadt, L.L.P.

(57) ABSTRACT

The invention relates to the use of an organic-inorganic hybrid material, comprising an inorganic solid support on which are grafted organic molecules having the general formula (I) below:

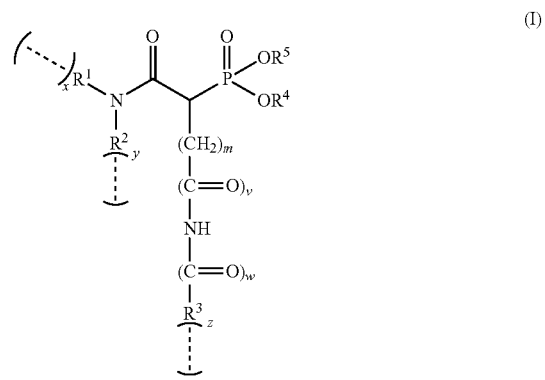

in which:
 x, y and z=0 or 1, with at least one of x, y and z different from 0; m=1 to 6;
 v and w=0 or 1, with v=1 when w=0, and v=0 when w=1;
 if x=0, $R^1$=H or a saturated or unsaturated, linear or branched, $C_1$ to $C_{12}$ hydrocarbon group, whereas, if x=1, $R^1$=a group bound to the inorganic solid support by at least one covalent bond; if y=0, $R^2$=H or a saturated or unsaturated, linear or branched, $C_1$ to $C_{12}$ hydrocarbon group, whereas, if y=1, $R^2$=a group bound to the inorganic solid support by at least one covalent bond; if z=0, $R^3$=H or a saturated or unsaturated, linear or branched, $C_1$ to $C_{12}$ hydrocarbon group, whereas, if z=1, $R^3$=a group bound to the inorganic solid support by at least one covalent bond;
 $R^4$ and $R^5$=H, a saturated or unsaturated, linear or branched, $C_2$ to $C_8$ hydrocarbon group, or a monocyclic aromatic group;
for extracting uranium(VI) from a sulfuric acid aqueous solution.
The invention also relates to a method that makes it possible to recover the uranium(VI) present in a sulfuric acid aqueous solution, selectively with respect to the other metal cations that may also be present in said solution.

18 Claims, 2 Drawing Sheets

(51) Int. Cl.
    C22B 3/42      (2006.01)
    B01J 20/32     (2006.01)
    B01J 20/28     (2006.01)
    B01J 20/22     (2006.01)
(52) U.S. Cl.
    CPC ....... *B01J 20/3204* (2013.01); *B01J 20/3251* (2013.01); *B01J 20/3259* (2013.01); *C22B 3/42* (2013.01); *C22B 60/0252* (2013.01); *Y02P 10/234* (2015.11)
(58) Field of Classification Search
    USPC ...................................... 423/6; 210/679, 682
    See application file for complete search history.

(56) References Cited

U.S. PATENT DOCUMENTS

| | | | |
|---|---|---|---|
| 6,174,505 | B1 | 1/2001 | Guilard et al. |
| 6,265,483 | B1 | 7/2001 | Guilard et al. |
| 6,410,143 | B1 | 6/2002 | Guilard et al. |
| 6,667,016 | B1 | 12/2003 | Meyer et al. |
| 2016/0016150 | A1* | 1/2016 | El Mourabit ............ B01J 45/00 423/6 |

OTHER PUBLICATIONS

International Search Report dated Feb. 11, 2015 in PCT/EP2014/073913 Filed Nov. 6, 2014.
French Search Report dated Jul. 29, 2014 in FR 13 60974 Filed Nov. 8, 2013.
Donia, et al., "Selective separation of U (VI) form its solutions using amine modified silica gel produced from leached zircon," International Journal of Mineral Processing, 2011, vol. 101 (8 pages).
Sadeghi, et al., "Magnetic nanoparticles with an imprinted polymer coating for the selective extraction of uranyl ions," Microchemica Acta, 2012, vol. 178 (5 pages).
Ahmed. et al., "Uranium extraction from sulfuric acid medium using trioctylamine impregnated activated carbon," Hydrometallurgy, 2013, vol. 134-135 (8 pages) XP-002727869.
Lebed, et al., "Large Pore Mesostructured Organosilica-Phosphonate Hybrids as Highly Efficient and Regenerable Sorbents for Uranium Sequestration," Chemistry of Materials, 2012, vol. 24 (6 pages).
Yuan, et al., "High performance of phosphonate-functionalized mesoporous silica for U (VI) sorption from aqueous solution," Dalton Transactions, 2011, vol. 40 (8 pages).
Fryxell, et al., "Actinide Sequestration Using Self-Assembled Monolayers on Mesoporous Supports," Environmental Science & Technology, 2005, vol. 39 (8 pages).
Yuan, et al., "A novel mesoporous material for uranium extraction, dihydromidazole functionalized SBA-15," Journal of Materials Chemistry, 2012, vol. 22 (8 pages) XP-002727872.
Zhao, et al., "Triblock Copolymer Syntheses of Mesoporous Silica with Periodic 50 to 300 Angstrom Pores," Science, 1998, vol. 279 (5 pages).
Jun, et al., "Synthesis of New, Nanoporous Carbon with Hexagonally Ordered Mesostructure," Journal of the American Chemical Society, 2000, vol. 122 (2 pages).
Wang, et al., "Selective solid-phase extraction of uranium by salicylideneimine-functionalized hydrothermal carbon," Journal of Hazardous Materials, 2012, vol. 229 (10 pages).
Naik, et al., "Use of organophosphorus extractants impregnated on silica gel for the extraction chromatographic separation fo minor actinides from high level waste solutions," Journal of Radioanalytical and Nuclear Chemistry, 2003, vol. 257 (6 pages) XP-002727870.
Carboni, et al., "Uranium Sorption with Functionalized Mesoporous Carbon Materials," Industrial & Engineering Chemistry Research, 2013, vol. 52 (11 pages) XP-002727871.

* cited by examiner

EtHex = 2-ethylhexyl

EtHex = 2-ethylhexyl

USE OF AN ORGANIC-INORGANIC HYBRID MATERIAL FOR EXTRACTING URANIUM(VI) FROM A SULFURIC ACID AQUEOUS SOLUTION, ISSUED NOTABLY FROM THE SULFURIC LEACHING OF A URANIUM-BEARING ORE

TECHNICAL FIELD

The invention relates to the field of the extraction of uranium from aqueous media containing sulfuric acid.

More specifically, the invention relates to the use of an organic-inorganic hybrid material for extracting uranium (VI) from a sulfuric acid aqueous solution in which it is present.

The invention also relates to a method which makes it possible to recover uranium(VI) present in a sulfuric acid aqueous solution, selectively with respect to the other metal cations that may also be present in said solution, and which implements said organic-inorganic hybrid material.

The invention notably finds application in the processing of uranium-bearing ores (uraninite, pitchblende, coffinite, brannerite, carnotite, etc.) to recover the uranium present in these ores with a view to upgrading it, in particular from a sulfuric acid aqueous solution resulting from the leaching of a uranium-bearing ore by sulfuric acid.

STATE OF THE PRIOR ART

Uranium-bearing ores (or uranium ores) are extracted from mines, crushed and ground until the consistency of a fine sand is attained, then they are subjected to an attack, also known as leaching, by sulfuric acid (except if their gangue is naturally alkaline, in which case this leaching would require a totally unacceptable consumption of sulfuric acid).

Sulfuric acid has been chosen for two reasons: on the one hand, it is the least expensive strong acid, this acid being able to be manufactured on the site of factories processing uranium-bearing ores from sulfur by a method known as "double catalysis", and, on the other hand, its use leads to effluents that are relatively easy to treat because sulphate ions can be to a large extent eliminated by precipitation with lime.

The attack of each uranium-bearing ore is studied on the basis of an optimisation of the dissolution yield of uranium (VI) compared to the quantity of sulfuric acid consumed. Certain ores are easily attacked in a stirred vessel and only require around 25 kg of neat sulfuric acid per tonne of ore, while others are only attacked in an autoclave and require more than 100 kg of neat sulfuric acid per tonne of ore.

In all cases, numerous other elements are also solubilised such as aluminium, iron and silica, which generally constitute the elements of the gangue, as well as elements which vary from one ore to another, both by their nature and by their quantity, such as molybdenum, zirconium and titanium.

After a filtration intended to eliminate insolubles, the aqueous solution from the leaching by sulfuric acid, which generally contains 0.1 to 10 g/L of uranium, is sent to a purification unit in which the uranium is purified either by liquid-liquid extraction or by extraction on ion exchange resins.

At present, the extractant the most conventionally used to purify uranium present in an aqueous solution from leaching by sulfuric acid and, whether this purification is performed by liquid-liquid extraction or by extraction on ion exchange resins, consists in a mixture of trialkylated tertiary amines of which the alkyl chains are $C_8$ to $C_{10}$, for example ADO-GEN® 364 or ALAMINE® 336, in solution in a kerosene type hydrocarbon, potentially supplemented by a heavy alcohol ($C_{10}$ to $C_{13}$) which plays the role of phase modifier.

Yet, the use of such an extractant does not give entire satisfaction.

In fact, apart from its selectivity for uranium compared to a certain number of impurities which would be worthy of improvement, it turns out that, on the one hand, the trialkylated tertiary amines are degraded into primary and secondary amines by acid hydrolysis during the method of purification—which further decreases the selectivity of the extraction of uranium—and that, on the other hand, it leads to the formation of interfacial grime that perturbs the operation of the devices in which the purification of uranium is carried out.

The development of novel extractants that are exempt from these drawbacks thus represents an important challenge for the uranium mining industry.

Essentially two techniques exist that make it possible to extract uranium from an aqueous medium: liquid-liquid extraction and solid-liquid extraction.

Liquid-liquid extraction consists in placing the aqueous medium which contains the uranium in contact with a liquid organic phase, non-miscible with water, which includes one or more uranium ligand compounds, in solution in an organic solvent. It is an efficient and relatively simple to implement technique. Nevertheless, when exploited at an industrial scale, it necessitates the use of considerable volumes of organic solutions that it is advisable, after having stripped the uranium therefrom for its recovery, to wash by different aqueous solutions in order to be able to re-use them. Moreover, the problem is posed of potential contamination of the uranium by chemical species from the organic solutions as well as that of the formation of a third phase by phase separation.

Solid-liquid extraction, which consists, for its part, in placing the aqueous medium containing the uranium in contact with a material including a solid support, organic or inorganic, impregnated with one or more uranium ligand compounds or on which are fixed molecules capable of retaining uranium by complexing effect or by ion exchange, does not have these drawbacks.

Concerning organic solid support materials, they nevertheless have limitations which essentially stem, on the one hand, from their low mechanical and chemical resistance in acidic and/or highly saline media and, on the other hand, from their tendency to swell and float in aqueous media, which curbs their use in the items of equipment that are typically used to carry out continuous solid-liquid extractions such as fluidised beds or cartridges.

Concerning inorganic solid support materials, they are more stable chemically than organic solid support materials and have, consequently, given rise recently to a certain number of works regarding the possibility of using them for extracting uranium from aqueous acid solutions, typically nitric.

Thus, the following have notably been proposed:

inorganic support materials functionalised by molecules with amine groups (Donia et al., *International Journal of Mineral Processing* 2011, 101(1-4), 81-88, [1]; Sadeghi et al., *Microchemica Acta* 2012, 178(1-2), 89-97, [2]), or impregnated with trioctylamine (Ahmed et al., *Hydrometallurgy* 2013, 134-135(0), 150-157, [3]); nevertheless, these materials prove not to be selective for uranium with respect to other metal cations;

inorganic support materials functionalised by molecules with phosphorous containing groups: for example, Lebed et al. (*Chemistry of Materials* 2012, 24(21), 4166-4176, [4]) have proposed a mesoporous silica functionalised by diethylphosphonate ethyitriethoxysilane groups on the surface of the pores of this silica, whereas Yuan et al. (*Dalton Transactions* 2011, 40(28), 7446-7453, [5]) have proposed a mesoporous silica functionalised with diethylphosphatoethyl triethoxysilane groups; nevertheless, further to the fact that the extraction tests described in these two references are carried out without competing ions, their results show poor performance of the materials at pH 2;

inorganic support materials functionalised by molecules of glycinylurea, salicylamide, acetamide phosphonate type (Fryxell et al., *Environmental Science & Technology* 2005, 39(5), 1324-1331, [6]) or still dihydroimidazole (Yuan et al., *Journal of Materials Chemistry* 2012, 22(33), 17019-17026, [7]); nevertheless, the extraction tests described in these references are not very conclusive, either because the extraction of uranium is very low or even zero at pHs of the order of 2, or because the selectivity of the extraction of uranium is not very selective, notably with respect to iron (reference [6]).

It should be noted that in none of the references cited above are the authors interested in a potential stripping of uranium from the materials that they propose. Yet, when uranium is extracted by solid-liquid extraction from a medium in which it is contained with a view to upgrading it, it is imperative to be able to then strip it efficiently from the material with which it has been extracted.

In view of the above, the Inventors have thus set themselves the aim of finding a material that makes it possible to extract, by the solid-liquid extraction technique, the uranium (VI) present in an aqueous medium containing sulfuric acid but which is, generally speaking, of higher performance than the materials proposed until now for the implementation of this technique.

More specifically, the Inventors have set themselves the aim that this material makes it possible to extract uranium (VI) very efficiently from an aqueous medium containing sulfuric acid in which it is contained and which also makes it possible to strip it very efficiently from this material in the case where it is wished to upgrade this uranium.

They have also set themselves the aim that, in the case where it is wished to upgrade the uranium, its extraction from the sulfuric acid solution and/or its stripping from the material make it possible to recover it in a selective manner with respect to the other cations that may be present in the sulfuric acid solution.

They have also set themselves the aim that said material is stable in aqueous acidic medium, that its preparation is relatively simple to implement, notably because it only resorts to reactions that are conventionally implemented in the synthetic chemistry field.

DESCRIPTION OF THE INVENTION

These aims and also others are attained by the invention which proposes in the first place the use of an organic-inorganic hybrid material, which comprises an inorganic solid support on which is grafted in a covalent manner a plurality of organic molecules complying with the general formula (I) below:

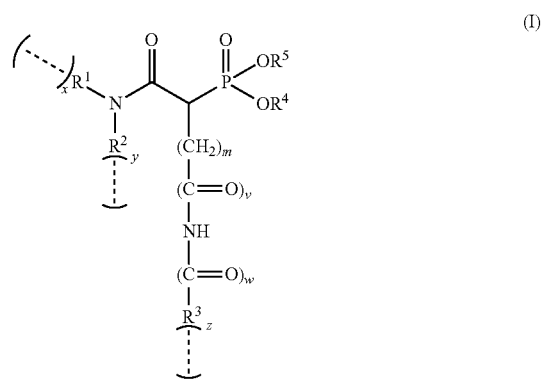

in which:

x, y and z are equal to 0 or 1, provided however that at least one of x, y and z is equal to 1;

m is a whole number ranging from 1 to 6;

v and w are equal to 0 or 1, provided however that v is equal to 1 when w is equal to 0 and that v: is equal to 0 when w is equal to 1;

if x is equal to 0, $R^1$ represents a hydrogen atom or a saturated or unsaturated, linear or branched hydrocarbon group, comprising 1 to 12 carbon atoms, whereas, if x is equal to 1, $R^1$ represents a group bound to the inorganic solid support by at least one covalent bond (materialised by the dotted line);

if y is equal to 0, $R^2$ represents a hydrogen atom or a saturated or unsaturated, linear or branched hydrocarbon group, comprising 1 to 12 carbon atoms, whereas, if y is equal to 1, $R^2$ represents a group bound to the inorganic solid support by at least one covalent bond (materialised by the dotted line);

if z is equal to 0, $R^3$ represents a hydrogen atom or a saturated or unsaturated, linear or branched hydrocarbon group, comprising 1 to 12 carbon atoms, whereas, if z is equal to 1, $R^3$ represents a group bound to the inorganic solid support by at least one covalent bond (materialised by the dotted line);

$R^4$ and $R^5$ represent, independently of each other, a hydrogen atom, a saturated or unsaturated, linear or branched hydrocarbon group, comprising 2 to 8 carbon atoms, or a monocyclic aromatic group;

for extracting uranium(VI) from a sulfuric acid aqueous solution.

Thus, according to the invention, an organic-inorganic hybrid material comprising a solid support of inorganic nature (which is thus more stable chemically than are typically supports made of organic polymers) is used, on which are fixed in a covalent manner molecules which, for their part, are of organic nature and comprise a diamidophosphonate unit which is capable of complexing uranium(VI) when it is present in an aqueous medium containing sulfuric acid and to retain it by this complexation mechanism.

Within the scope of the present invention, is considered as "inorganic" any element (compound, material, etc.) that it is likely to decompose at a temperature above 800° C., whereas is considered as "organic" any element that is likely to decompose at a temperature less than or equal to 800° C.

"Saturated or unsaturated, linear or branched hydrocarbon group, comprising 1 to 12 carbon atoms" is taken to mean any alkyl, alkenyl or alkynyl group, with linear or branched chain, which comprises at least 1 carbon atom but which does not comprise more than 12 carbon atoms. Such a group may thus comprise 1 carbon atom, 2 carbon atoms, 3 carbon atoms, 4 carbon atoms, etc., up to 12 carbon atoms included.

In an analogous manner, "saturated or unsaturated, linear or branched hydrocarbon group, comprising 2 to 8 carbon atoms" is taken to mean any alkyl, alkenyl or alkynyl group, with linear or branched chain, which comprises at least 2 carbon atoms but which does not comprise more than 8 carbon atoms. Such a group may thus comprise 2 carbon atoms, 3 carbon atoms, 4 carbon atoms, etc., up to 8 carbon atoms included.

"Monocyclic aromatic group" is taken to mean any group with a single aromatic ring and of which the aromatic ring complies with the Hückel aromaticity rule and thus has a number of delocalised π electrons equal to 4n+2, for example a phenyl or benzyl group.

According to the invention, the inorganic solid support may be constituted of any inorganic solid material on which it is possible to fix in a covalent manner organic molecules by one or more chemical reactions.

Thus, the inorganic solid support may notably be based on (1) a metal oxide and, in particular, a transition metal oxide such as a titanium oxide or a zirconium oxide (or zircona), a poor metal oxide such as an aluminium oxide (or alumina), a non-metallic oxide such as a silica oxide (or silica), a silica glass or a germanium oxide, (2) a mixed metal oxide such as an aluminosilicate, an aluminosilicate glass, a zirconium silicate, a tin silicate or a cerium silicate, (3) a mixture of metal oxides such as a borosilicate or a borosilicate glass, or (4) carbon (graphite, fullerenes including the nanotubes, mesoporous carbon, etc.), and come in a large variety of forms (particles, granules, beads, membranes, fibres, felts, etc.), sizes (nano-, micro- or macroscopic) and structures (porous or not, with interconnected pores or not, ordered or not, etc.).

Nevertheless, in order to optimise the extraction performances of the organic-inorganic hybrid material according to the invention, it is preferred that the inorganic solid support has (after grafting of the organic molecules) a specific surface area greater than or equal to 100 m²/g (as determined by gas adsorption-desorption with the BET method), which is made possible by the use of a porous material.

This porous material may be a microporous material, that is to say a material of which the diameter of the pores is less than 2 nm according to the definition of the International Union of Pure and Applied Chemistry), a mesoporous material, that is to say a material of which the diameter of the pores is comprised between 2 and 50 nm (also according to the IUPAC definition), a macroporous material, that is to say a material of which the diameter of the pores is greater than 50 nm (still according to the IUPAC definition), or instead a material with double porosity, for example both mesoporous and macroporous, or even with triple porosity. It may, moreover, be ordered or disordered.

As non-limiting examples of materials that may be suitable, ordered mesoporous silicas such as silicas of MCM and SBA type, disordered porous silicas such as porous silica glasses of VYCOR™ type (available notably from the firm Corning), mesoporous titanium oxides, mesoporous zirconium oxides, ordered porous carbons such as mesoporous carbons of CMK type and carbon nanotubes, and disordered porous carbons such as activated carbons may notably be cited.

Preferably, the inorganic solid support is constituted of a mesoporous or macroporous material and is, in particular, selected from mesoporous silicas, mesoporous titanium oxides, mesoporous zirconium oxides and mesoporous carbons.

Among these materials, mesoporous silicas and mesoporous carbons are quite particularly preferred, in particular ordered mesoporous silicas of SBA type and ordered mesoporous carbons of CMK type.

According to the invention, the organic molecules may be grafted on the inorganic solid support through $R^3$, in which case $R^3$ represents, preferably, a group of formula —$(CH_2)_q$—$X^1$— in which q is a whole number ranging from 0 to 12, whereas $X^1$ represents a group selected from the groups:

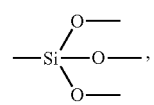

more simply written —$SiO_3$— below;

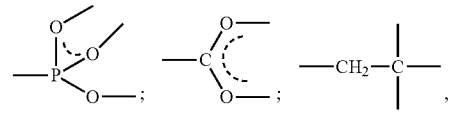

more simply written —$CH_2$—C— below; and
—CH=CH—;
depending on the nature of the inorganic solid support.

It should be understood that, when $R^3$ represents a group of formula —$(CH_2)_q$—$X^1$—, the covalent bond(s) between $R^3$ and the inorganic solid support is (are) assured by the —$X^1$— group and not by the —$(CH_2)_q$— group.

In a variant or in a complementary manner, the organic molecules may also be grafted on the inorganic solid support through at least one of $R^1$ and $R^2$, in which case $R^1$ and/or $R^2$ represent, preferably, a group of formula (a), (b), (c), (d), (e), (f) or (g) below:

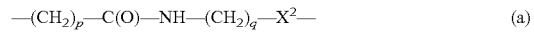 (a)

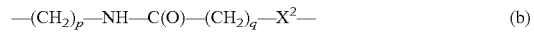 (b)

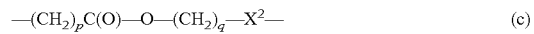 (c)

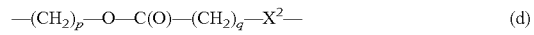 (d)

 (e)

 (f)

 (g)

in which p is a whole number ranging from 1 to 6, q is a whole number ranging from 0 to 12, whereas $X^2$ represents a group selected from the groups:

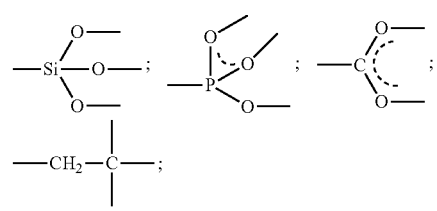

and —CH=CH—.

Here also, it should be clearly understood that when $R^1$ and/or $R^2$ represent a group of formula (a), (b), (c), (d), (e), (f) or (g) above, the covalent bond(s) existing between $R^1$ and/or $R^2$ on the one hand, and the inorganic solid support on the other hand, is(are) assured by the —$X^2$— group and not by the —$(CH_2)_p$— group.

In the case where the organic molecules are grafted on the inorganic solid support both through $R^3$ and through at least one of $R^1$ and $R^2$, then $X^1$ (which belongs to $R^3$) is, preferably, identical to $X^2$ (which belongs to $R^1$ and/or $R^2$). Thus, for example, if $R^3$ represents a —$(CH_2)_q$—$SiO_3$— group, then $R^1$ and/or $R^2$ can comply with any of the formulas (a) to (g) above but in which $X^2$ represents preferentially a —$SiO_3$— group. Similarly, if $R^3$ represents a —$(CH_2)_q$—$CH_2$—C— group, then $R^1$ and/or $R^2$ may comply with any of the formulas (a) to (g) above but in which $X^2$ represents preferentially a —$CH_2$—C— group.

According to the invention, the organic molecules comply with, preferably, the general formula (I) above in which v is equal to 1, w is equal to 0, in which case these organic molecules comply with the specific formula (Ia) below:

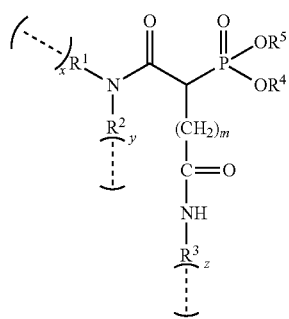

(Ia)

in which x, y, z, m, $R^1$, $R^2$, $R^3$, $R^4$ and $R^5$ have the same signification as previously.

Even more, molecules of the specific formula (Ia) above which x and y are 0, $R^1$ and $R^2$ represent, independently of each other, an alkyl group, linear or branched, comprising 1 to 12 carbon atoms; z is 1 and $R^3$ represents a group bound to the inorganic solid support by at least one covalent bond, whereas $R^4$ and $R^5$ represent, independently of each other, a hydrogen atom or an alkyl group, linear or branched, including 2 to 8 carbon atoms, are preferred.

Advantageously, $R^1$ and $R^2$ are identical to each other and represent a branched alkyl group, comprising 6 to 12 carbon atoms, the 2-ethylhexyl group being quite particularly preferred.

As for $R^4$ and $R^5$, they represent preferentially, independently of each other, a hydrogen atom or an alkyl group, linear or branched, comprising 2 to 4 carbon atoms such as an ethyl, n-propyl, isopropyl, n-butyl, sec-butyl, isobutyl or tert-butyl group, ethyl and n-butyl groups being, among these alkyl groups, quite particularly preferred.

According to a particularly preferred disposition, the inorganic solid support is based on a metal oxide, a mixed metal oxide, or a mixture of metal oxides, in which case $R^3$ represents a group of formula —$(CH_2)_q$—$SiO_3$— in which q is equal to 1 to 5.

In a variant, the inorganic solid support is based on carbon, in which case $R^3$ represents a group of formula —$(CH_2)_q$—$CH_2$—C— in which q is equal to 0 to 5.

According to the invention, the covalent grafting of organic molecules on the inorganic solid support may be obtained by a single step method, which consists in making one or more functions F1 belonging to the inorganic solid support react with one or more reactive functions F2 of an organic compound which comprises, apart from these reactive functions F2, the diamidophosphonate complexing unit, so as to obtain the covalent fixation of this organic compound on the inorganic solid support by reaction of the reactive functions F1 and F2 with each other. In this case, the organic molecules of general formula (I) above correspond to what remains of the organic compound after the reactive functions F1 and F2 have reacted with each other.

Thus, for example, in the case where the inorganic solid support is based on silica, the covalent grafting of the organic molecules on the inorganic solid support may be obtained by making the silanol function (—SiOH) of the silica react with a trialkoxysilane function (for example, trimethoxy-, triethoxy- or tripropoxy-silane) of an organic compound which also comprises the diamidophosphonate complexing unit.

In a variant, the grafting of the organic molecules on the inorganic solid support may be obtained by a two-step method, which consists:
in firstly making one or more reactive functions F1 belonging to the inorganic solid support react with one or more reactive functions F2 of a first organic compound, which comprises two different types of reactive functions, respectively F2 and F3, so as to obtain the covalent fixation of the first organic compound on the inorganic solid support by reaction of said reactive functions F1 and F2 with each other and the functionalisation of the inorganic solid support with the reactive function(s) F3; then
this or these reactive functions F3 are then made to react with one or more reactive functions F4 belonging to a second organic compound which comprises, apart from these reactive functions F4, the diamidophosphonate complexing unit, so as to obtain the covalent fixation of the second organic compound on the first by reaction of said reactive functions F3 and F4 with each other. In this case, the organic molecules of the general formula (I) above correspond to the molecular assembly formed by what remains of the first and second organic compounds after the reactive functions F1 and F2, then F3 and F4 have reacted with each other.

This second way of operating is well suited to the grafting of organic molecules on inorganic solid supports based on one or more metal oxides or carbon and will thus be favoured for this type of support.

Thus, for example, in the case where the inorganic solid support is based on silica, the covalent grafting of the organic molecules on the inorganic solid support may be obtained by firstly making the silanol functions (—SiOH) of the silica react with a trialkoxysilane function of a first organic compound which also comprises an amine function, then by making this amine function react with a carboxylic acid function of a second organic compound which also comprises the diamidophosphonate complexing unit.

According to the invention, the sulfuric acid aqueous solution from which is extracted the uranium(VI) is advantageously a solution that comes from the leaching of a uranium-bearing ore by sulfuric acid, in which case this aqueous solution comprises typically 0.1 to 10 g/L of uranium, 0.1 to 2 mol/L of sulphate ions, at an acidity of 0.01 to 0.5 mol/L.

The extraction of uranium(VI) from a sulfuric acid aqueous solution by means of an organic-inorganic hybrid material as defined previously is extremely simple to implement since it suffices to place this aqueous solution in contact with the material, for example in a reactor under stirring or in a column, for a sufficient time to enable the uranium(VI) to be complexed by the material, then separating the aqueous solution from the material. Typically, 0.01 to 1 L of aqueous solution is used for 0.05 to 5 kg of material.

The subject matter of the invention is also a method for recovering the uranium(VI) present in a sulfuric acid aqueous solution, which method comprises:

a) extracting uranium(VI) from the aqueous solution, by putting the aqueous solution in contact with an organic-inorganic hybrid material as defined previously, then separating of the aqueous solution from the organic-inorganic hybrid material;

b) washing the organic-inorganic hybrid material obtained at the end of step a) with water; and c) stripping uranium(VI) from the organic-inorganic hybrid material obtained at the end of step b) by putting the organic-inorganic hybrid material in contact with an aqueous solution comprising sulfuric acid, then separating the organic-inorganic hybrid material from the aqueous solution comprising sulfuric acid.

In this method, the sulfuric acid aqueous solution, which is used at step a), is advantageously a solution that comes from the leaching of a uranium-bearing ore by sulfuric acid, in which case this aqueous solution typically comprises 0.1 to 10 g/L of uranium, 0.1 to 2 mol/L of sulphate ions, at an acidity of 0.01 to 0.5 mol/L.

The water, which is used at step b), is preferentially deionised water whereas the aqueous solution comprising sulfuric acid, which is used at step c), is preferentially a solution which comprises 1 to 10 mol/L of sulfuric acid.

Other characteristics and advantages of the invention will become clearer on reading the complement of the description that follows, which relates to examples of preparing useful hybrid organic-inorganic materials according to the invention as well as examples of demonstration of the properties of these materials.

Obviously, these examples are only given as illustrations of the subject matter of the invention and do not constitute in any way a limitation of this subject matter.

DETAILED DESCRIPTION OF PARTICULAR EMBODIMENTS

Example 1: Preparation of a First Useful Organic-Inorganic Hybrid Material According to the Invention A first useful organic-inorganic hybrid material is prepared according to the invention, below designated material M1, which comprises a mesoporous silica with periodic hexagonal structure, of SBA-15 type, on which are grafted organic molecules complying with the general formula (I) above in which:

m is 1;
v is 1 (and thus w is 0);
$R^1$ and $R^2$ both represent a 2-ethylhexyl group,
$R^3$ represents a —$(CH_2)_3$—$SiO_3$— group,
$R^4$ represents an ethyl group, whereas
$R^5$ represents a hydrogen atom.

Figure 1:
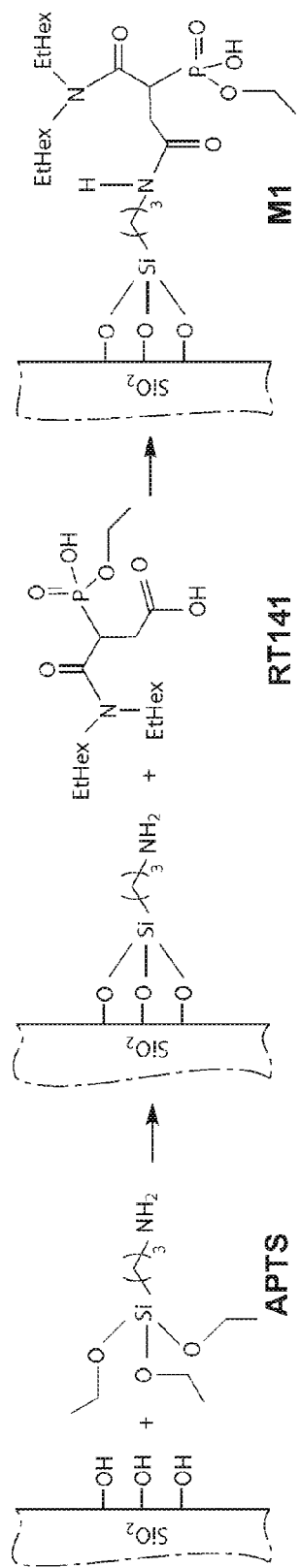
FIG. 1 schematically illustrates the preparation of a first useful organic-inorganic hybrid material according to the invention, in which the inorganic solid support is a mesoporous silica and in which the organic molecules comply with the general formula (I) above in which m and v are 1, $R^1$ and $R^2$ both represent a 2-ethylhexyl group, $R^3$ represents a —$(CH_2)_3$—$SiO_3$— group, $R^4$ represents an ethyl group, whereas $R^5$ represents a hydrogen atom.

This organic-inorganic hybrid material is prepared by the method illustrated in FIG. 1, which includes:

(1) the functionalisation of the mesoporous silica with amine functions, which is carried out by a silanisation reaction, that is to say by making the silanol functions (Si—OH) of this silica react with the ethoxysilane functions of 3-aminopropyltriethoxysilane (commercially available), noted APTS in FIG. 1; then (2) the grafting of 3-(N,N-di(2-ethylhexyl)carbamoyl)-3-(ethoxy)-hydroxyphosphono)propanoic acid, or compound RT141, on the amine functions of the silica thereby functionalised, which is carried out by peptide coupling, that is to say by making said amine functions react with the carboxylic acid functions of this compound.

1.1—Synthesis of the Mesoporous Silica

The mesoporous silica is synthesised by following an operating protocol identical to that described by Zhao et al. in *Science* 1998, 279, 548-552, reference [7]. It has pores of 9.1 nm diameter (as determined according to the BJH method) and a BET specific surface area of 800 $m^2$/g (as determined by nitrogen adsorption-desorption).

1.2—Functionalisation of the Mesoporous Silica

After activation (that is to say heating under vacuum to 130° C. for 24 hours), the mesoporous silica (1.8 g) is suspended in a solution containing 0.5 g of 3-aminopropyltriethoxysilane in 20 mL of toluene. The mixture is heated to 90° C. for 48 hours under nitrogen, then filtered and washed with acetone before being treated with acetone in a Soxhlet for 48 hours. The aminosilica thereby obtained is dried in an oven (80° C.) for 20 hours.

Its physical-chemical characteristics are the following:
diameter of the pores (BJH method): 8.4 nm;
BET specific surface area (nitrogen adsorption-desorption): 460 $m^2$/g;
weight loss (ATG analysis): 9%;
elementary analysis found: C, 5.0%; N, 1.7%; P, 0%;
quantity of amine functions grafted: 1.4 mmol/g of mesoporous silica.

1.3—Synthesis of the Compound RT141

Figure 3:
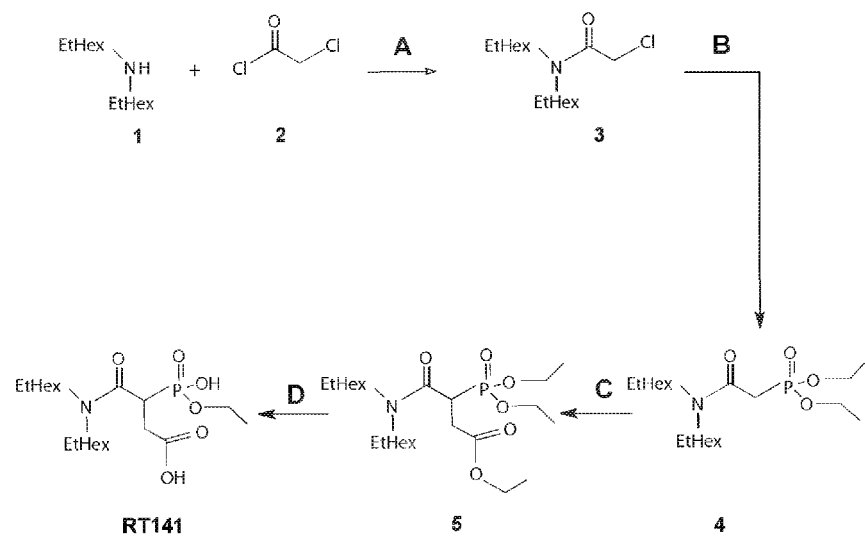
FIG. 3 schematically illustrates the reaction scheme of synthesis of an organic compound useful for the preparation of the hybrid organic-inorganic materials shown in FIGS. 1 and 2.

The compound RT141 is synthesised using the reaction scheme comprising the steps A, B, C and D which is illustrated in FIG. 3.

As may be seen in this figure, this synthesis consists in making react in a first step, noted A, 2,2'-diethylhexylamine, noted 1, with chloroacetyl chloride, noted 2, to obtain 2-chloro-N,N-diethylhexylacetamide, noted 3 in this figure.

To do so, potassium carbonate (2 eq.) is added under stirring to a 0.7 mol/L solution of 2,2'-diethylhexylamine in dichloromethane. The suspension thereby obtained is cooled to 0° C. and chloroacetyl chloride (1.5 eq.) is added to it drop by drop. The mixture is left to return to room temperature. Once the amine has been consumed (which is verified by thin layer chromatography (TLC) using ethyl acetate as eluant and ninhydrin as developer), 4 equivalents of water are added drop by drop to the mixture, which causes an effervescence. When this effervescence has finished, a quantity of water equal to half the volume of dichloromethane having been used to dissolve the amine is added to this mixture. The mixture is maintained under stirring for 15 minutes. The aqueous and organic phases are then separated and the organic phase is dried over $Na_2SO_4$, filtered and concentrated. The expected compound is thereby obtained (Yield: 97%) of which the characterisations by $^1H$ and $^{13}C$ NMR are given below.

$^1H$ NMR (400 MHz, $CDCl_3$) δ (ppm): 0.85-0.91 (m, 12H, $CH_3$); 1.23-1.33 (m, 16H, $CH_2$); 1.55-1.60 (m, 1H, CH—$CH_2$—N); 1.67-1.73 (m, 1H, CH—$CH_2$—N); 3.18 (d, 2H, J=7.5 Hz, $CH_2$—N); 3.22-3.32 (m, 2H, $CH_2$—N); 4.09 (s, 2H, $CH_2$—Cl);

$^{13}C$ NMR (100 MHz, $CDCl_3$) δ(ppm): 10.7; 11.0; 14.1 ($CH_3$); 23.1; 23.9; 24.0; 28.7; 28.9; 30.4; 30.6 ($CH_2$); 36.8; 38.5 (CH); 41.6 ($CH_2$—Cl); 48.8 ($CH_2$—N); 51.7 ($CH_2$—N); 167.1 (C=O).

In a second step, noted B in FIG. 3, 2-chloro-N,N-diethylhexylacetamide is subjected to an Arbuzov reaction to obtain diethyl 1-(N,N-diethylhexylcarbamoyl)methylphosphonate, noted 4 in this figure.

This Arbuzov reaction is carried out by taking a mixture composed of 2-chloro-N,N-diethylhexylacetamide (1 eq.) and triethylphosphite (1.2 eq.) to 160° C. at reflux for 3 hours. Once the acetamide has been consumed (which is verified by TLC using dichloromethane as eluant and UV or phosphomolybdic acid as developer), the excess of phosphite is distilled under reduced pressure. The expected compound is thereby obtained (Yield: quantitative) of which the characterisations by $^1H$, $^{13}C$ and $^{31}P$ NMR are given below.

$^1H$ NMR (400 MHz, $CDCl_3$) δ (ppm): 0.81-0.86 (m, 12H, $CH_3$); 1.21-1.32 (m, 22H, $CH_2$, O—$CH_2$—$CH_3$); 1.51-1.57 (m, 1H, CH—$CH_2$—N); 1.64-1.71 (m, 1H, CH—$CH_2$—N); 3.02 (d, 2H, J=22.0 Hz, CO—$CH_2$—P); 3.21-3.27 (m, 4H, $CH_2$—N); 4.08-4.16 (m, 4H, O—$CH_2$—$CH_3$);

$^{13}C$ NMR (100 MHz, $CDCl_3$) δ (ppm): 10.6; 11.0; 14.1; 14.2 ($CH_3$); 16.3; 16.4 (O—$CH_2$—$CH_3$); 23.1; 23.2; 23.5; 23.9; 28.8; 28.9; 30.4; 30.6 ($CH_2$); 33.1; 34.5 (d, J=134.0 Hz, $CH_2$—P); 37.0; 38.6 (CH); 48.9; 52.3 ($CH_2$—N); 62.5 (d, J=6.5 Hz, O—$CH_2$—$CH_3$); 165.2 (d, J=6.0 Hz, C=O);

$^{31}P$ NMR (160 MHz, $CDCl_3$) δ (ppm): 21.8.

In a third step, noted C in FIG. 3, diethyl 1-(N,N-diethylhexylcarbamoyl)methylphosphonate is subjected to a C-alkylation reaction to obtain ethyl 3-(N,N-di(2-ethylhexyl)carbamoyl)-3-(diethoxy)phosphono)propanoate, noted 5 in this figure.

To do so, a solution of diethyl 1-(N,N-diethylhexylcarbamoyl)-methylphosphonate (dried beforehand for 2.5 hours at 80° C. under vacuum) in anhydrous tetrahydrofuran (THF—1 eq.—1 mol/L) is added, drop by drop and under stirring, to a suspension of sodium hydride (1.5 eq.—washed beforehand with pentane) in anhydrous THF (2 mol/L). The mixture is stirred for 1 hour at room temperature then the solution is cooled to 0° C. and a solution of ethyl acetate bromide (1.5 eq.) is added drop by drop. This mixture is left to return to room temperature which is then stirred for 1 hour, after which the crude is acidified up to pH 1 using a 1 mol/L aqueous solution of hydrochloric acid and extracted with dichloromethane. The aqueous and organic phases are separated and the organic phase is dried over $Na_2SO_4$, filtered and concentrated. The excess bromide is eliminated by distillation under vacuum. The expected compound is thereby obtained (Yield: quantitative) of which the characterisations by $^1H$, $^{13}C$ and $^{31}P$ NMR are given below.

$^1H$ NMR (400 MHz, $CDCl_3$) δ (ppm): 0.77-0.89 (m, 12H); 1.16-1.28 (m, 27H); 1.63-1.70 (m, 1H); 1.74-1.83 (m, 1H); 2.68-2.76 (m, 1H); 2.70-2.90 (m, 1H); 3.01-3.18 (m, 2H); 3.50-3.75 (m, 3H); 4.01-4.13 (m, 6H);

$^{13}C$ NMR (100 MHz, $CDCl_3$) δ (ppm): 10.3; 10.5; 10.6; 10.9; 14.0; 14.1; 16.3; 16.4; 23.1; 23.5; 23.7; 24.0; 28.6; 28.7; 28.8; 28.9 30.2; 30.3; 30.6; 30.7; 32.7; 37.0; 37.1; 37.2; 37.3; 37.7-39.1 (d, J=132.0 Hz); 38.6; 38.7; 38.9; 50.2; 50.6; 50.9; 51.2; 51.9; 52.4; 60.8; 62.4; 62.5; 63.1; 63.2; 63.3; 167.4; 168.5; 171.3-171.5 (dd, J=18.5 Hz, d=4.5 Hz);

$^{31}P$ NMR (160 MHz, $CDCl_3$) δ (ppm): 23.1.

In a final step, noted D in FIG. 3, ethyl 3-(N,N-di(2-ethylhexyl)carbamoyl)-3-(diethoxy)phosphono)propanoate is subjected to a saponification reaction to obtain the compound RT141.

This saponification is carried out by adding, to a 0.4 mol/L solution of ethyl 3-(N,N-di(2-ethylhexyl)carbamoyl)-3-(diethoxy)phosphono)propanoate in ethanol, a 20% sodium hydroxide solution (6 eq.). The mixture is taken to reflux for 3 hours. After cooling, the mixture is acidified to pH 1 using a 1 mol/L aqueous solution of hydrochloric acid, then extracted twice with dichloromethane. The aqueous and organic phases are separated and the organic phase is dried over $Na_2SO_4$, filtered and concentrated. The expected compound is thereby obtained (Yield: quantitative) of which the characterisations by $^1H$, $^{13}C$ and $^{31}P$ NMR are given below.

$^1H$ NMR (400 MHz, $CDCl_3$) δ (ppm): 0.82-0.92 (m, 12H); 1.22-1.38 (m, 19H); 1.66-1.73 (m, 1H); 1.74-1.82 (m, 1H); 2.88-3.0 (m, 2H); 3.01-3.23 (m, 2H); 3.46-3.80 (m, 3H); 4.07-4.17 (m, 2H); 8.96 (ls, 2H);

$^{13}C$ NMR (100 MHz, $CDCl_3$) δ (ppm): 10.3; 10.5; 10.7; 10.8; 14.0; 16.2; 16.3; 23.0; 23.4; 23.6; 23.8; 28.5; 28.6; 28.7; 30.2; 30.3; 30.4; 32.9; 37.1; 37.7-39.0 (d, J=132.0 Hz); 38.5; 38.6; 50.4; 50.6; 52.3; 52.8; 62.4 168.8; 174.2 (d, J=9.0 Hz); 174.4 (d, J=9.0 Hz);

$^{31}P$ NMR (160 MHz, $CDCl_3$) δ (ppm): 24.0.

1.4—Grafting of the Compound RT141 on Aminosilica

The aminosilica (1 eq. of amine functions) and the compound RT141 (2 eq.) are made to react in anhydrous THF in the presence of dicyclohexylcarbodiimide (DDC—2 eq.), N-hydroxybenzotriazole (HOBt—2 eq.) and diisopropylthylamine (DIPEA—1.5 eq.) for 48 hours, at room temperature and under argon flow.

After which, the reaction medium is filtered, the residue is washed several times with dichloromethane and methanol and dried under vacuum at 90° C.

In this way is obtained the material 1 of which the characterisations by $^{13}C$, $^{31}P$ and $^{29}Si$ CPMAS NMR and the physical-chemical characteristics are given below.

$^{13}C$ NMR δ (ppm): 8.5; 11.73; 15.23; 22.39; 28.34; 37.23; 40.74; 48.30; 60.07; 172.44;

$^{31}P$ NMR δ (ppm): 18.11;

$^{29}Si$ NMR δ (ppm): −59.01; −66.05 (sites $T^2$ and $T^3$); −101.12; −110.01 (sites $Q^3$ and $Q^4$);

Diameter of the pores (BJH model): 5.5 nm;
BET specific surface area (nitrogen adsorption-desorption): 400 $m^2/g$;
Weight loss (ATG analysis): 19%;
Elementary analysis found: C, 12.4%; N, 1.9%; P, 1.1%;
Quantity of molecules of the compound RT141 grafted: 0.46 mmol/g of material M1.

Example 2: Preparation of a Second Useful Organic-Inorganic Hybrid Material According to the Invention A second useful organic-inorganic hybrid material is prepared according to the invention, below designated material M2, which includes a mesoporous carbon with periodic hexagonal structure, of CMK-3 type, on which are grafted organic molecules complying with the general formula (I) above in which:
  m is 1;
  v is 1 (and thus w is 0);
  $R^1$ and $R^2$ both represent a 2-ethylhexyl group,
  $R^3$ represents a —$CH_2$—C— group,
  $R^4$ represents an ethyl group, whereas
  $R^5$ represents a hydrogen atom.

Figure 2:
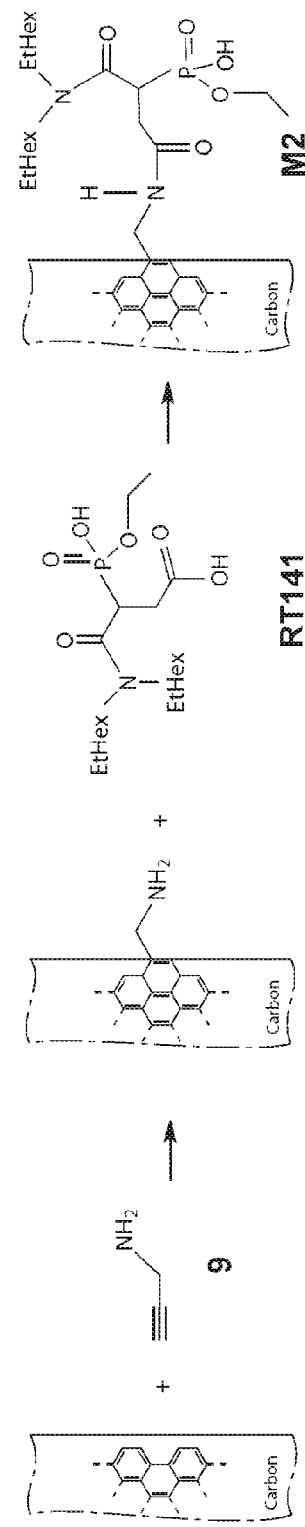
FIG. 2 schematically illustrates the preparation of a second useful organic-inorganic hybrid material according to the invention, in which the inorganic solid support is a mesoporous carbon and in which the organic molecules comply with the general formula (I) above in which $R^1$ and $R^2$ both represent a 2-ethylhexyl group, $R^3$ represents a —$CH_2$—$C(O)$—$NH$—$CH_2$—$C$— group, $R^4$ represents an ethyl group, whereas $R^5$ represents a hydrogen atom.

This organic-inorganic hybrid material is prepared by the method illustrated in FIG. 2, which comprises:

(1) the functionalisation of the mesoporous carbon with amine functions, which is carried out by a Diels-Alder reaction, that is to say by making the conjugated diene functions of this carbon react with the alkynyl functions of propargylamine, noted 9 in FIG. 2; then (2) the grafting of the compound RT141 on the amine functions of the carbon thereby functionalised, which is carried out by peptide coupling as in example 1 above.

2.1—Synthesis of the Mesoporous Carbon

The mesoporous carbon is synthesised following the operating protocol described by Jun et al. in *Journal of the American Chemical Society* 2000, 122, 10712-10713, reference [8]. It has pores of 3.5 nm diameter (as determined according to the BJH method) and a BET specific surface area of 1400 m$^2$/g (as determined by nitrogen adsorption-desorption).

2.2—Functionalisation of the Mesoporous Carbon

The mesoporous carbon (0.5 g) is suspended in neat propargylamine.

The mixture is placed in an autoclave heated to 100° C. for 48 hours. After which, it is washed with acetone in a Soxhlet for 48 hours.

The aminocarbon thereby obtained is dried in an oven (80° C.) for 20 hours.

Its physical-chemical characteristics are the following:
  diameter of the pores (BJH method): 3.0 nm;
  BET specific surface area (nitrogen adsorption-desorption): 600 m$^2$/g;
  elementary analysis found: N, 1.1%; P, 0%; O, 2.6%.
  quantity of amines grafted: 0.79 mmol/g of mesoporous carbon.

2.3—Grafting of the Compound RT141 on the Aminocarbon

This grafting is carried out by following an operating protocol identical to that described in example 1 above for the grafting of the compound RT141 on aminosilica.

It leads to the material 2 of which the physical-chemical characteristics are the following:
  diameter of the pores (BJH method): 2.8 nm;
  BET specific surface area (nitrogen adsorption-desorption): 300 m$^2$/g;
  elementary analysis found: N, 1.3%; P, 0.9%; O, 3.9%;
  quantity of molecules RT141 grafted: 0.38 mmol/g of material M2.

Example 3: Properties of the Useful Hybrid Organic-Inorganic Materials According to the Invention

3.1—Extraction and Stripping Tests Carried Out from a Sulfuric Acid Aqueous Solution Only Comprising Uranium as Metal Cation

3.1.1—Extraction Tests

The capacity of the material M1, as obtained in example 1 above, to extract uranium(VI) from a sulfuric acid solution is assessed by extraction tests that are carried out in tubes and which consist:
  in mixing this material in powder form with 10 mL of a sulfuric acid aqueous solution, of pH equal to 2.2 and only comprising uranium(VI) as metal cation;
  in leaving the mixture for 24 hours under stirring (in a Turbula mixer), at room temperature (~25° C.); then
  in separating by filtration the solid and liquid phases of this mixture.

Two different tests are carried out:
  a first test—below test 1—in which 100.3 mg of material M1 and a sulfuric acid aqueous solution which includes 0.0125 mol/L of sulphate ions are used, and
  a second test—below test 2—in which 102.8 mg of material M1 and a sulfuric acid aqueous solution which includes 0.533 mol/L of sulphate ions are used. To guarantee that this solution has the same pH as the solution used in test 1, the increase in the sulphate ion content is achieved by addition of sodium sulphate salt ($Na_2SO_4$).

The concentrations of uranium(VI) are determined in the aqueous solutions of sulfuric acid before they are mixed with the hybrid material M1 as well as in the filtrates.

From the concentrations thereby obtained, for uranium (VI) are calculated:
  the quantity extracted per g of material M1, noted $Q_{ext}$, and expressed in mg/g, by applying the following formula (i):

$$Q_{ext} = (C_{ini} - C_{end}) \times \frac{V}{m} \qquad (i)$$

with:
$C_{ini}$=initial concentration in the sulfuric acid aqueous solution (in mg/L);
$C_{end}$=concentration in the filtrate (in mg/L);
V=volume of sulfuric acid aqueous solution mixed with the material M1 (in L);
m=mass of material M1 used in the test (in g);
  the distribution coefficient, noted $K_d$ and expressed in L/g, by applying the following formula (ii):

$$Kd = \frac{Q_{ext}}{C_{end}} \qquad (ii)$$

in which $Q_{ext}$ and $C_{end}$ have the same signification as previously.

Table I below presents the results obtained for each of tests 1 and 2.

TABLE I

|  |  | Test 1 ([SO$_4^{2-}$] = 0.0125M) | Test 2 ([SO$_4^{2-}$] = 0.533M) |
|---|---|---|---|
| U(VI) | $C_{ini}$ (mg/L) | 110 | 118 |
|  | $C_{end}$ (mg/L) | 2 | 18 |
|  | $Q_{ext}$ (mg/g) | 11 | 10 |
|  | Kd (L/g) | 5.5 | 0.555 |

3.1.2—Stripping Tests

The possibility of stripping, from the material M1, uranium(VI) having been extracted by this material in tests 1 and 2 described at point 3.1.1 above is assessed by tests that are carried out in tubes and which consist:

in washing the solid phases, such as obtained at the end of these tests, 3 times with deionised water to desorb the elements physisorbed on the surface of the material M1, which makes it possible to determine the quantity of uranium(VI) having actually been complexed by this material;

in mixing the solid phases thereby washed with 10 mL of an aqueous solution containing 3 mol/L of sulfuric acid;

in leaving the mixture for 24 hours under stirring (in a Turbula mixer), at room temperature (~25° C.);

in separating by filtration the solid and liquid phases of the mixture; then in determining the quantity of uranium(VI) present in the filtrate.

Table II presents the results obtained for each of the solid phases obtained at the end of tests 1 and 2.

TABLE II

| U(VI) | Solid phase from test 1 ($[SO_4^{2-}]$ = 0.0125M) | Solid phase from test 2 ($[SO_4^{2-}]$ = 0.533M) |
|---|---|---|
| Initial quantity (in mg for 10 mL of solution) | 1.10 | 1.18 |
| Quantity extracted (in mg for 10 mL of solution) | 1.08 | 1.00 |
| Quantity recovered after 3 washings with water (mg) | 0 | 0.02 |
| Quantity recovered after stripping with $H_2SO_4$ (mg) | 0.8 | 0.27 |
| Percentage recovery (compared to the initial quantity in the solution) | 73 | 25 |

Tables I and II show:

on the one hand, that uranium(VI) has been almost totally complexed by the organic molecules of the material M1 during the extractions carried out at point 3.1 above since it is very little desorbed by washings with deionised water; and on the other hand, that it is possible to strip uranium(VI) from the material M1 by means of a sulfuric acid aqueous solution but that this stripping is more efficient when it is carried out from the material M1 having served to extract uranium(VI) from the sulfuric acid aqueous solution that is the least concentrated in sulphate ions.

3.2—Extraction and Stripping Tests Carried Out from a First Sulfuric Acid Aqueous Solution Including a Plurality of Metal Cations 3.2.1—Extraction Tests The ability of the material M1 to extract selectively uranium(VI) from a sulfuric acid aqueous solution is assessed by extraction tests that are carried out in tubes and which consist:

in mixing this material in powder form with 10 mL of a sulfuric acid aqueous solution simulating an aqueous solution from the leaching by sulfuric acid of a uranium-bearing deposit of the type of that situated at Imouraren in Niger but diluted 3 times;

in leaving the mixture for 24 hours under stirring (in a Turbula mixer), at room temperature (~25° C.); then in separating by filtration the solid and liquid phases of this mixture.

The qualitative and quantitative composition of metal cations of the sulfuric acid aqueous solution is presented in table III below.

TABLE III

| Metal cations | Concentrations (mg/L) |
|---|---|
| U | 124 |
| Fe | 1435 |
| Ti | 34.3 |
| Zr | 5.2 |
| Mo | 22.4 |
| Al | 176 |
| Ma | 3410 |
| Mg | 1800 |
| V | 68 |

This composition has a high concentration of sulphate ions, 0.5 mol/L, i.e. a ratio of molar concentrations U(VI)/$SO_4^{2-}$ of $10^{-3}$. Its pH is 2.1.

Two different tests are carried out: a first test—below test 3—in which 100.5 mg of material M1 are used and a second test—below test 4—in which 101.1 mg of material M1 are used.

The concentrations of uranium(VI), iron, titanium, zirconium and molybdenum are determined from the filtrates.

From the concentrations thereby obtained, for each of these metal cations are determined:

the quantity extracted per g of material M1, noted $Q_{ext}$, and expressed in mg/g, which is determined by the formula (i) indicated at point 3.1.1 above;

the distribution coefficient, noted $K_d$ and expressed in L/g, which is determined by the formula (ii) indicated at point 3.1.1 above.

The selectivity coefficient of the material for uranium(VI) with respect to the other metal cations is also determined. This coefficient, which is noted $S_{U/M}$, is determined by the following formula (iii):

$$S_{U/M} = \frac{Kd_U}{Kd_M} \quad \text{(iii)}$$

in which $Kd_U$ is the distribution coefficient of uranium(VI), whereas $Kd_M$ is the distribution coefficient of the metal cation M with respect to which the selectivity for uranium is assessed. In this respect, it is pointed out that a selectivity coefficient $S_{U/M}>1$ indicates a selectivity for uranium with respect to the metal cation M.

Table IV below presents the results obtained for each of tests 3 and 4.

TABLE IV

| | Tests | Metal cations | | | | |
| | | U | Fe | Ti | Zr | Mo |
|---|---|---|---|---|---|---|
| $C_{ini}$ (mg/L) | Tests 3 and 4 | 124 | 1435 | 34.3 | 5.2 | 22.4 |
| $C_{end}$ (mg/L) | Test 3 | 71.0 | 1162 | 22.7 | 2.5 | 17.0 |
| | Test 4 | 74.1 | 1314 | 24.6 | 2.2 | 17.4 |

TABLE IV-continued

|  | Tests | U | Fe | Ti | Zr | Mo |
|---|---|---|---|---|---|---|
| $Q_{ext}$ (mg/g) | Test 3 | 5.3 | 27.2 | 1.1 | 0.3 | 0.5 |
|  | Test 4 | 5.0 | 12.0 | 1.0 | 0.3 | 0.5 |
| Kd (L/g) | Test 3 | 0.0743 | 0.0234 | 0.0508 | 0.1075 | 0.0316 |
|  | Test 4 | 0.0666 | 0.0091 | 0.0390 | 0.1349 | 0.0284 |
| $S_{U/M}$ | Test 3 |  | 3.18 | 1.46 | 0.69 | 2.35 |
|  | Test 4 |  | 8.15 | 1.90 | 0.55 | 2.61 |

This table shows that the material M1 extracts uranium preferentially to the other metal cations except in the case of zirconium since the selectivity coefficient $S_{U/Zr}$ is less than 1.

3.2.2—Stripping Tests

Stripping tests are carried out in tubes which consist:
in washing the solid phases, such as obtained at the end of the extraction tests 3 and 4 carried out at point 3.2.1 above, 3 times with deionised water to desorb the elements physisorbed on the surface of the material M1 and to determine exactly the quantity of uranium(VI), iron, titanium, zirconium and molybdenum having been complexed by this material;
in mixing the solid phases thereby washed with 10 mL of an aqueous solution containing 3 mol/L of sulfuric acid;
in leaving the mixture for 24 hours under stirring (in a Turbula mixer), at room temperature (~25° C.);
in separating by filtration the solid and liquid phases of the mixture; then
in determining the quantity of uranium(VI), iron, titanium, zirconium and molybdenum present in the filtrate.

Table V below presents the results obtained for each of the solid phases obtained at the end of tests 3 and 4.

TABLE V

|  | Test from which the solid phase is derived | Metal cations | | | | |
|---|---|---|---|---|---|---|
|  |  | U | Fe | Ti | Zr | Mo |
| Initial quantity (in mg for 10 mL of solution) | Tests 3 and 4 | 1.24 | 14.35 | 0.34 | 0.05 | 0.22 |
| Quantity extracted (in mg for 10 mL of solution) | Test 3 | 0.53 | 2.73 | 0.12 | 0.03 | 0.02 |
|  | Test 4 | 0.50 | 1.20 | 0.10 | 0.03 | 0.05 |
| Quantity recovered after 3 washings with water (mg) | Test 3 | 0.06 | 2.54 | 0.03 | 0 | 0.02 |
|  | Test 4 | 0.13 | >1.2 | 0.04 | 0 | 0.03 |
| Quantity recovered after stripping with $H_2SO_4$ (mg) | Test 3 | 0.51 | 1.15 | 0.11 | 0 | 0.05 |
|  | Test 4 | 0.21 | 0.35 | 0.06 | 0.01 | 0.02 |
| Efficiency of the stripping (%) | Test 3 | >100 | >100 | >100 | 0 | >100 |
|  | Test 4 | 69.5 | >100 | >100 | 21.7 | >100 |

This table shows that a disparity exists in the results obtained for iron and molybdenum, probably due to analysis errors.

Nevertheless, from the results presented in tables IV and V, it may be concluded:

that the material M1 makes it possible to extract uranium (VI) from a sulfuric acid aqueous solution with a capacity of the order of 5 g/kg of material;
that the material M1 has a very high selectivity for uranium(VI) with respect to iron and titanium and a lower selectivity but nevertheless strong with respect to molybdenum;
that after the washings with water of the material M1, the selectivity of the latter for uranium(VI) with respect to iron and molybdenum is increased since the quasi-totality of the iron and molybdenum having been extracted is desorbed by these washings;
that uranium(VI) is indeed complexed by the material M1 since it is not desorbed by the washings with water;
that, on the other hand, the stripping by the sulfuric acid aqueous solution makes it possible to recover the quasi-totality of uranium having been extracted by the material M1; and
that, if the material M1 has proved not to be selective for uranium(VI) with respect to zirconium during the extraction (see table IV), zirconium is not stripped from the material M1 by the sulfuric acid aqueous solution, which makes it possible to obtain selectivity during the stripping.

3.3—Extraction and Desorption Tests Carried Out from a Second Sulfuric Acid Aqueous Solution Comprising a Plurality of Metal Cations 3.3.1—Extraction Test In order to evaluate the influence of the concentration of uranium(VI) on the one hand, and the ratio of the molar concentrations $SO_4^{2-}/U(VI)$ on the other hand, on the extractive properties of the material M1, an extraction test identical to those carried out at point 3.2.1 above is carried out in tubes, except that 250.6 mg of material M1 are used and that a sulfuric acid aqueous solution simulating an aqueous solution from the leaching by sulfuric acid of a uranium-bearing deposit of the type of that situated in Imouraren of which the uranium(VI) content has been deliberately increased is used.

The qualitative and quantitative composition of metal cations of the sulfuric acid aqueous solution is presented in table VI below.

TABLE VI

| Metal cations | Concentrations (mg/L) |
|---|---|
| U | 2870 |
| Fe | 1377 |
| Ti | 31.3 |
| Zr | 2.3 |
| Mo | 20.1 |
| Al | 187 |
| Mg | 1735 |
| V | 62.3 |

Its molar concentration of $SO_4^{2-}$ ions is 0.497.

Table VII below presents, for uranium(VI), iron and titanium, their initial concentration in the sulfuric acid aqueous solution ($C_{ini}$), their final concentration in the filtrate ($C_{end}$), the quantity extracted per g of material M1 ($Q_{ext}$), their distribution coefficient ($K_d$) and, for iron and titanium, the selectivity coefficient of the material M1 for uranium(VI) with respect to each of these two metal cations ($S_{U/M}$).

TABLE VII

| | Metal cations | | |
| --- | --- | --- | --- |
| | U | Fe | Ti |
| $C_{ini}$ (mg/L) | 2870 | 1377 | 31.1 |
| $C_{end}$ (mg/L) | 2250 | 1316 | 28.7 |
| $Q_{ext}$ (mg/g) | 24.74 | 2.43 | 0.10 |
| Kd (L/g) | 0.0110 | 0.0018 | 0.0033 |
| $S_{U/M}$ | | 5.9 | 3.3 |

This test, which was carried out to assess the maximum capacity of the material M1 to extract uranium(VI) from a complex sulfuric acid aqueous solution, makes it possible to demonstrate that this maximum extraction capacity is 25 g/kg and that in the presence of a sulfuric acid aqueous solution at high uranium(VI) concentration, the selectivity of the material M1 for uranium(VI) with respect to iron and titanium is good.

3.3.2—Desorption Test

The solid phase, such as obtained at the end of the extraction test described at point 3.3.1 above, is washed 3 times with deionised water and the quantities of uranium (VI), iron and titanium still present on this solid phase at the end of these washings are determined.

The quantity of uranium(VI) is 13.17 mg per g of material M1, whereas the quantities of iron and titanium are equal to 0 mg/g of material M1, which signifies that after 3 washings with water, the material M1 has a total selectivity for uranium(VI) with respect to iron and titanium.

REFERENCES CITED

[1] Donia et al., *International Journal of Mineral Processing* 2011, 101(1-4), 81-88
[2] Sadeghi et al., *Microchemica Acta* 2012, 178(1-2), 89-97
[3] Ahmed et al., *Hydrometallurgy* 2013, 134-135(0), 150-157
[4] Lebed et al., *Chemistry of Materials* 2012, 24(21), 4166-4176
[5] Yuan et al., *Dalton Transactions* 2011, 40(28), 7446-7453
[6] Fryxell et al., *Environmental Science & Technology* 2005, 39(5), 1324-1331
[7] Yuan et al., *Journal of Materials Chemistry* 2012, 22(33), 17019-17026
[8] Zhao et al., *Science* 1998, 279, 548-552,
[9] Jun et al., *Journal of the American Chemical Society* 2000, 122, 10712-10713

The invention claimed is:

1. A method of extracting uranium(VI) from a sulfuric acid aqueous solution, comprising:
(i) contacting the sulfuric acid aqueous solution with an organic-inorganic hybrid material, which comprises an inorganic solid support on which is grafted in a covalent manner a plurality of organic molecules of formula (I):

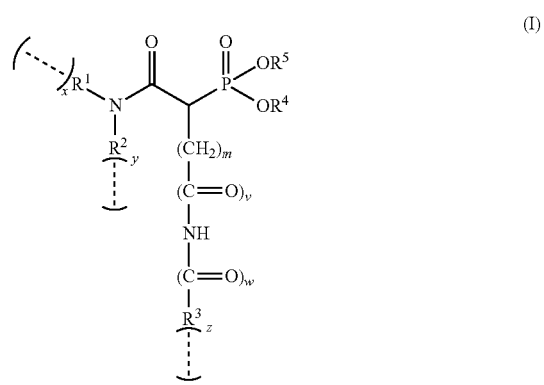

wherein:
x, y and z are equal to 0 or 1, with the proviso that at least one of x, y and z is equal to 1;
m is a whole number ranging from 1 to 6;
v and w are equal to 0 or 1, with the proviso that v is equal to 1 when w is equal to 0 and that v is equal to 0 when w is equal to 1;
if x is equal to 0, $R^1$ represents a hydrogen atom or a saturated or unsaturated, linear or branched hydrocarbon group, comprising 1 to 12 carbon atoms, whereas, if x is equal to 1, $R^1$ represents a group bound to the inorganic solid support by at least one covalent bond indicated by the dotted line;
if y is equal to 0, $R^2$ represents a hydrogen atom or a saturated or unsaturated, linear or branched hydrocarbon group, comprising 1 to 12 carbon atoms, whereas, if y is equal to 1, $R^2$ represents a group bound to the inorganic solid support by at least one covalent bond indicated by the dotted line;
if z is equal to 0, $R^3$ represents a hydrogen atom or a saturated or unsaturated, linear or branched hydrocarbon group, comprising 1 to 12 carbon atoms, whereas, if z is equal to 1, $R^3$ represents a group bound to the inorganic solid support by at least one covalent bond indicated by the dotted line; and
$R^4$ and $R^5$ represent, independently of each other, a hydrogen atom, a saturated or unsaturated, linear or branched hydrocarbon group, comprising 2 to 8 carbon atoms, or a monocyclic aromatic group; and then
(ii) separating the sulfuric acid aqueous solution from the organic-inorganic hybrid material,
wherein the sulfuric acid aqueous solution comprises 0.1 to 10 g/L of uranium, 0.1 to 2 mol/L of sulfate ions, and 0.01 to 0.5 mol/L of sulfuric acid.

2. The method of claim 1, wherein the inorganic solid support comprises a metal oxide, a mixed metal oxide, a mixture of metal oxides, or carbon.

3. The method of claim 1, wherein the inorganic solid support comprises a porous material.

4. The method of claim 3, wherein the porous material is a mesoporous material or a macroporous material.

5. The method of claim 4, in which the porous material is a mesoporous silica, a mesoporous titanium oxide, a mesoporous zirconium oxide, or a mesoporous carbon.

6. The method of claim 5, wherein the inorganic solid support is an SBA mesoporous silica or a CMK mesoporous carbon.

7. The method of claim 1, wherein $R^3$ represents a group of formula $-(CH_2)_q-X^1-$ in which q is a whole number ranging from 0 to 12, and $X^1$ represents:

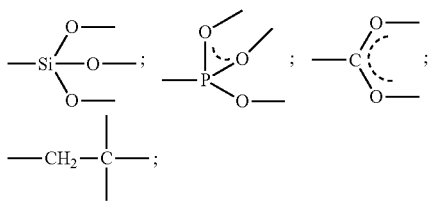

or

—CH=CH—.

8. The method of claim 1, wherein at least one of $R^1$ and $R^2$ represents a group of formula (a), (b), (c), (d), (e), (f) or (g):

$$-(CH_2)_p-C(O)-NH-(CH_2)_q-X^2-\quad (a)$$

$$-(CH_2)_p-NH-C(O)-(CH_2)_q-X^2-\quad (b)$$

$$-(CH_2)_p-C(O)-O-(CH_2)_q-X^2-\quad (c)$$

$$-(CH_2)_p-O-C(O)-(CH_2)_q-X^2-\quad (d)$$

$$-(CH_2)_p-O-(CH_2)_q-X^2-\quad (e)$$

$$-(CH_2)_p\text{-triazole-}(CH_2)_q-X^2-\quad (f)$$

$$-(CH_2)_q-X^2-\quad (g)$$

wherein p is a whole number ranging from 1 to 6, q is a whole number ranging from 0 to 12, and $X^2$ represents:

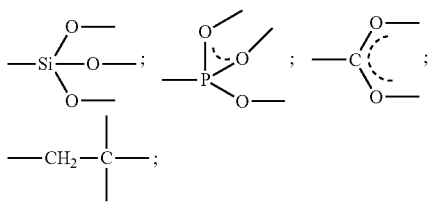

or

—CH=CH—.

9. The method of claim 8, wherein $R^3$ represents a group of formula $—(CH_2)_q—X^1—$ in which q is a whole number ranging from 0 to 12, and $X^i$ is identical to $X^2$.

10. The method of claim 1, wherein the organic molecules have a formula (Ia):

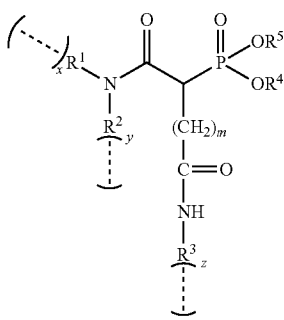

(Ia)

wherein x, y, z, m, $R^1$, $R^2$, $R^3$, $R^4$ and $R^5$ are as defined in formula (I).

11. The method of claim 10, wherein x and y are 0, $R^1$ and $R^2$ represent, independently of each other, a linear or branched alkyl group comprising 1 to 12 carbon atoms; z is 1 and $R^3$ represents a group bound to the inorganic solid support by at least one covalent bond, and $R^4$ and $R^5$ represent, independently of each other, a hydrogen atom or a linear or branched alkyl group, comprising 2 to 8 carbon atoms.

12. The method of claim 11, wherein $R^1$ and $R^2$ are identical to each other and represent a branched alkyl group, comprising 6 to 12 carbon atoms.

13. The method of claim 11, wherein $R^4$ and $R^5$ represent, independently of each other, a hydrogen atom or a linear or branched alkyl group, comprising 2 to 4 carbon atoms.

14. The method of claim 10, wherein the inorganic solid support comprises a metal oxide, a mixed metal oxide, or a mixture of metal oxides, and $R^3$ represents a group:

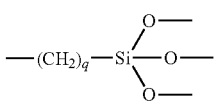

wherein q is equal to 1 to 5.

15. The method of claim 10, wherein the inorganic solid support comprises carbon and $R^3$ represents a group:

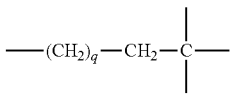

wherein q is equal to 0 to 5.

16. The method of claim 1, wherein the sulfuric acid aqueous solution is obtained from leaching of a uranium-bearing ore by sulfuric acid.

17. A method of recovering uranium(VI) from a first sulfuric acid aqueous solution, comprising:
   a) extracting uranium(VI) from the first sulfuric acid aqueous solution, by
      (i) contacting the first sulfuric acid aqueous solution with an organic-inorganic hybrid material, which comprises an inorganic solid support on which is grafted in a covalent manner a plurality of organic molecules of formula (1):

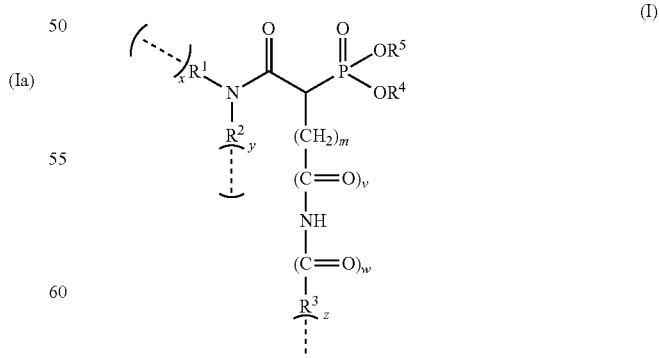

(I)

wherein:
x, y and z are equal to 0 or 1, with the proviso that at least one of x, y and z is equal to 1;

m is a whole number ranging from 1 to 6;

v and w are equal to 0 or 1, with the proviso that v is equal to 1 when w is equal to 0 and that v is equal to 0 when w is equal to 1;

if x is equal to 0, $R^1$ represents a hydrogen atom or a saturated or unsaturated, linear or branched hydrocarbon group, comprising 1 to 12 carbon atoms, whereas, if x is equal to 1, $R^1$ represents a group bound to the inorganic solid support by at least one covalent bond indicated by the dotted line;

if y is equal to 0, $R^2$ represents a hydrogen atom or a saturated or unsaturated, linear or branched hydrocarbon group, comprising 1 to 12 carbon atoms, whereas, if y is equal to 1, $R^2$ represents a group bound to the inorganic solid support by at least one covalent bond indicated by the dotted line;

if z is equal to 0, $R^3$ represents a hydrogen atom or a saturated or unsaturated, linear or branched hydrocarbon group, comprising 1 to 12 carbon atoms, whereas, if z is equal to 1, $R^3$ represents a group bound to the inorganic solid support by at least one covalent bond indicated by the dotted line; and $R^4$ and $R^5$ represent, independently of each other, a hydrogen atom, a saturated or unsaturated, linear or branched hydrocarbon group, comprising 2 to 8 carbon atoms, or a monocyclic aromatic group; and then (ii) separating the first sulfuric acid aqueous solution from the organic-inorganic hybrid material;

b) washing the separated organic-inorganic hybrid material obtained in a) with water; and c) stripping uranium(VI) from the washed organic-inorganic hybrid material obtained in b) by contacting the organic-inorganic hybrid material with a second sulfuric acid aqueous solution, then separating the organic-inorganic hybrid material from the second sulfuric acid aqueous solution, wherein the first sulfuric acid aqueous solution comprises 0.1 to 10 g/L of uranium, 0.1 to 2 mol/L of sulfate ions, and 0.01 to 0.5 mol/L of sulfuric acid.

18. The method of claim 17, wherein the first sulfuric acid aqueous solution is obtained from leaching of a uranium-bearing ore by sulfuric acid.

* * * * *